3,294,784
PROCESS FOR THE PREPARATION OF 3-AMINO-
Δ$^{1,3,5(10)}$-ESTRATRIENES AND 19-NOR-Δ$^{1,3,5(10)}$-PREGNATRIENES
Francisco Alvarez, Palo Alto, Calif., assignor to Syntex Corporation, Panama, Panama, a corporation of Panama
No Drawing. Filed Mar. 11, 1965, Ser. No. 439,081
18 Claims. (Cl. 260—239.5)

This invention relates to a novel process for the preparation of cyclopentanopolyhydrophenanthrene derivatives and to novel cyclopentanopolyhydrophenanthrene derivative prepared thereby.

More particularly, this invention relates to a novel process for the preparation of 3-amino-Δ$^{1,3,5(10)}$-estratrienes and 3-amino-19-nor-Δ$^{1,3,5(10)}$-pregnatrienes, which process can be illustrated schematically as follows, using, for the sake of simplicity, only the A and B rings of the steroid nucleus:

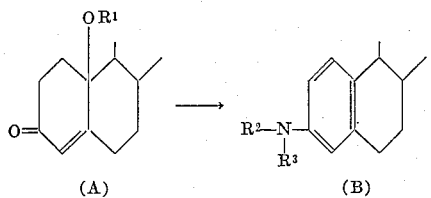

(A)                    (B)

In these formulas $R^1$ represents a lower acyl group containing from 2 to 7 carbon atoms, inclusive, and $R^2$ and $R^3$ represent hydrogen, a hydrocarbon radical, e.g., an alkyl (including straight- and branched-chain alkyl and cycloalkyl), alkenyl (including straight- and branched-chain alkenyl and cycloalkenyl) or aryl (including alkaryl and aralkyl) group, preferably one containing from 1 to 19 carbon atoms, inclusive, such as methyl, ethyl, propyl, isopropyl, cyclopentyl, cyclohexyl, vinyl, allyl, methallyl, cyclohexenyl, phenyl, tolyl, xylyl or benzyl, or, taken singly or together, a saturated or unsaturated (including aromatic) fused hydrocarbon ring structure, preferably one containing from 9 to 30 carbon atoms, inclusive, such as indanyl, indenyl, naphthyl, acenaphthenyl, anthryl or cyclopentanopolyhydrophenanthryl rings, or, taken singly or together, a heterocyclic ring system such as pyrryl, pyrrolidyl, pyridyl, piperidyl, furyl, furfuryl, morpholinyl or thienyl, all of which can either be unsubstituted or can contain or be substituted with one or more non-interfering substituents, e.g., hydroxyl groups, acyloxy groups, esterified carboxy groups, ether groups, such as methoxy, ethoxy and tetrahydropyranyloxy groups, ketal groups, such as cycloethylenedioxy and cyclopropylenedioxy groups, amino (including substituted amino) groups, nitro groups, halogen atoms, such as fluorine, chlorine and bromine, and the like, with at least one of $R^2$ and $R^3$ being other than hydrogen.

Unless otherwise specified, the acyloxy and acyl groups referred to herein are preferably derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

Besides the substituent shown at the 3-position of the steroid nucleus in partial Formula A hereinabove, the conventional substituents found at the 17-position in androstane derivatives, i.e., a 17β-hydroxy or acyloxy group together with a 17α-hydrogen atom, lower alkyl group, lower alkenyl group or lower alkynyl group, or a 17-keto group or ketalized keto group, and those found in the 17-, 20-, 21- and sometimes the 16-position in pregnane derivatives, e.g., a 17β-acetal side chain, with or without a 17α-hydroxy or -acyloxy substituent, a 17β-acetyl side chain having a ketalized 20-keto group, a dihydroxyacetone side chain wherein the hydroxyl groups are either free or functionally converted, e.g., one wherein one or both of the hydroxyl groups have been esterified or wherein the entire side chain has been converted to a bismethylenedioxy grouping, a 16α- or 16β-hydroxy, acyloxy or methyl group, a 16α,17α-cyclic acetal or ketal grouping, such as a 16α,17α-isopropylidenedioxy grouping or the like, the steroid starting materials employed in the novel process of the present invention can also contain other non-interfering substituents. Included among such substituents are keto groups or derivatives thereof, such as enol ether or ketal groups, hydroxyl groups or derivatives thereof, such as ether, ester, acetal or ketal derivatives, alkyl groups, such as methyl, ethyl or propyl groups, nitro groups, amino (including substituted amino) groups, halogen atoms, such as fluorine, chlorine or bromine, and the like, which, depending on the particular substituent and steroid in question, can be present at one or more of positions 1, 2, 4, 7, 8, 9, 11, 12, 13, 14, 15, 16, 18, 19, 20 and 21 on the steroid nucleus.

The 10β-lower acyloxy-Δ$^4$-3-keto steroids employed as starting materials in the novel process of the present invention can themselves be prepared as described in my copending U.S. patent application Serial No. 382,360, filed July 13, 1964 now U.S. Patent No. 3,248,407. Included among these compounds are:

Δ$^4$-estren-10β-ol-3,17-dione 10-acetate,
Δ$^4$-estrene-10β,17β-diol-3-one 10-acetate,
Δ$^4$-estrene-10β,17β-diol-3-one 10,17-diacetate,
17α-methyl-Δ$^4$-estrene-10β,17β-diol-3-one 10-acetate,
17α-ethyl-Δ$^4$-estrene-10β,17β-diol-3-one 10-acetate,
17α-vinyl-Δ$^4$-estrene-10β,17β-diol-3-one 10-acetate,
17α-ethynyl-Δ$^4$-estrene-10β,17β-diol-3-one 10,17-diacetate,
19-nor-Δ$^4$-pregnen-10β-ol-3,20-dione 10-acetate,
19-nor-Δ$^4$-pregnene-10β,17β-diol-3,20-dione 10-acetate,
19-nor-Δ$^4$-pregnene-10β,17α-diol-3,20-dione 10,17-diacetate,
16β-methyl-19-nor-Δ$^4$-pregnen-10β-ol-3,20-dione 10-acetate,
16α,17α-isopropylidenedioxy-19-nor-Δ$^4$-pregnen-10β-ol-3,20-dione 10-acetate,
16α-methyl-19-nor-Δ$^4$-pregnene-10β,17α-diol-3,20-dione 10,17-diacetate,
17,20;20,21-bismethylenedioxy-19-nor-Δ$^4$-pregnen-10β-ol-3,11-dione 10-acetate, and the like.

The amines which can be employed in practicing the novel process of the present invention are primary and secondary monoamines and polyamines in which the amino nitrogen which is ultimately bonded to the 3-carbon atom in the steroid final product can be attached to a primary, secondary or tertiary carbon atom, e.g., to a carbon atom or atoms contained in either or both of the substituents represented by R² and R³ in partial formula B hereinabove.

An illustrative but by no means exhaustive listing of such amines includes aliphatic and cycloaliphatic primary monoamines such as methylamine, ethylamine, n-propylamine, isopropylamine, n-butylamine, sec-butylamine, t-butylamine, n-amylamine, 2-amino-4-methylpentane, other amyl, hexyl, heptyl, octyl and higher primary aliphatic monoamines, cyclopentylamine, cyclohexylamine, ring-alkylated cyclopentyl- and cyclohexylamines, vinylamine, allylamine, cyclohexenylamine, and the like, aliphatic and cycloaliphatic secondary monoamines, such as dimethylamine, diethylamine, di-n-propylamine, diisopropylamine, di-n-butylamine, N-methyl-N-n-butylamine, N-ethyl-N-n-butylamine, N-methylcyclohexylamine, N-ethylcyclohexylamine, N-butylcyclohexylamine, dicyclopentylamine, dicyclohexylamine, ring-alkylated dicyclohexylamines, and the like, arylamines such as benzylamine, ring-alkylated benzylamines, β-phenylethylamine, aniline, o-, m- and p-fluoro-, chloro- and bromoaniline, o-, m- and p-nitroaniline, o-, m- and p-anisidine, o-, m- and p-toluidine, o-, m- and p-aminoacetophenone, tetrahydro-β-naphthylamine, 5,10-dihydroacridine, N-methylaniline, diphenylamine, dibenzylamine, N-benzyl-N-methylaniline, and the like, alkylol and alkyl alkylol primary and secondary monoamines such as ethanolamine, propanolamine, diethanolamine, methylmethanolamine, methylethanolamine, ethylmethanolamine, and the like, alkylene polyamines and polyalkylene polyamines such as ethylene diamine, (N,N)-diethyl-1,2-ethylene diamine, trimethylene diamine, 1,2-diaminopropane, tetramethylene diamine, diethylene triamine, triethylene tetramine, tetraethylene pentamine, tris-(3-aminopropyl)amine, 3,3'-iminobispropylamine, and the like, arylene polyamines such as o-, m- and p-phenylene diamine, N,N-dimethyl-o-phenylenediamine, N,N'-di-p-tolyl-o-phenylenediamine, N-methyl-p-phenylenediamine, N,N-diethyl-p-phenylenediamine, and the like, heterocyclic amines such as pyrrolidine, piperidene, 2-, 3- and 4-pipecoline, piperazine, furfurylamine, tetrahydrofurfurylamine, morpholine, and the like, esterified amino acids such as methyl aminoethanoate, ethyl α-aminopropionate, and the like, and steroidal amines such as 7-aminocholesterol, 17β-amino-Δ⁵-androsten-3β-ol, and the like.

In carrying out the novel process of the present invention the steroid starting material, dissolved in an inert organic solvent, e.g., an aliphatic or aromatic hydrocarbon such as pentane, hexane, heptane, benzene, toluene or xylene, a halogenated hydrocarbon such as methylene dichloride, chloroform, carbon tetrachloride or chlorobenzene, an ether such as dioxane or tetrahydrofuran, or the like, as well as mixtures thereof, is reacted with from about 1 to about 10 mols of the amine, and preferably with from about 1.1 to about 1.5 mols, per mol of the steroid.

The use of small amounts of a relatively weak acid catalyst, e.g., from about 0.001 to about 10 percent by weight, based on the weight of the steroid starting material, of a weak organic acid such as acetic, propionic, oxalic or malonic acid, or the like, is preferred. However, where the amine employed is one which is capable of forming enamines in the absence of an acid catalyst, e.g., pyrrolidine or the like, the catalyst may be omitted.

The reaction can be carried out at temperatures ranging from room temperature (about 25° C.) or below to the reflux temperature of the solvent or solven mixture employed, and will generally take from about 1 hour to about 72 hours or longer to go to completion, depending on such factors as the reactants employed, the amount and strength of the acid catalyst, if one is used, and the temperature at which the reaction is carried out.

Included among the 3-substituted amino-Δ¹,³,⁵⁽¹⁰⁾-estratrienes and 3-substituted amino-19-nor-Δ¹,³,⁵⁽¹⁰⁾-pregnatrienes which can be prepared by the novel process of the present invention are those compounds represented by the general formulas:

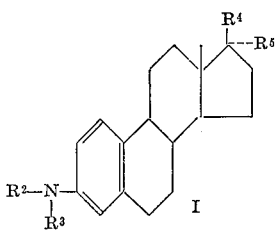 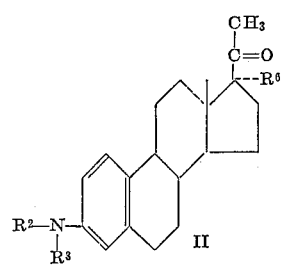

In these formulas R² and R³ have the same meanings as set forth hereinabove for partial formula B, R⁴ represents a hydroxyl group or an acyloxy group, R⁵ represents hydrogen, a lower alkyl group, a lower alkenyl group or a lower alkynyl group, R⁴ and R⁵ taken together represent a keto group, and R⁶ represents hydrogen, a hydroxyl group or an acyloxy group.

Among the compounds represented by these general formulas are:

3-methylamino-Δ¹,³,⁵⁽¹⁰⁾-estratrien-17-one,
3-methylamino-Δ¹,³,⁵⁽¹⁰⁾-estratrien-17β-ol,
3-ethylamino-17α-methyl-Δ¹,³,⁵⁽¹⁰⁾-estratrien-17β-ol,
3-cyclohexylamino-17α-vinyl-Δ¹,³,⁵⁽¹⁰⁾-estratrien-17β-ol,
3-vinylamino-17α-ethynyl-Δ¹,³,⁵⁽¹⁰⁾-estratrien-17β-ol,
3-diethylamino-Δ¹,³,⁵⁽¹⁰⁾-estratrien-17-one,
3-diethylamino-Δ¹³,⁵⁽¹⁰⁾-estratrien-17β-ol,
3-diethylamino-Δ¹,³,⁵⁽¹⁰⁾-estratrien-17β-ol 17-acetate,
3-diethylamino-17α-methyl-Δ¹,³,⁵⁽¹⁰⁾-estratrien-17β-ol,
3-diethylamino-17α-vinyl-Δ¹,³,⁵⁽¹⁰⁾-estratrien-17β-ol,
3-diethylamino-17α-ethynyl-Δ¹,³,⁵⁽¹⁰⁾-estratrien-17β-ol,
3-N-methylcyclohexylamino-Δ¹,³,⁵⁽¹⁰⁾-estratrien-17-one,
3-benzylamino-Δ¹,³,⁵⁽¹⁰⁾-estratrien-17β-ol,
3-(N-anilino)-17α-methyl-Δ¹,³,⁵⁽¹⁰⁾-estratrien-17β-ol,
3-(N-p-nitroanilino)-17α-vinyl-Δ¹,³,⁵⁽¹⁰⁾-estratrien-17β-ol,
3-(N-p-fluoroanilino)-17α-ethynyl-Δ¹,³,⁵⁽¹⁰⁾-estratrien-17β-ol,
3-diphenylamino-Δ¹,³,⁵⁽¹⁰⁾-estratrien-17-one,
3-ethanolamino-Δ¹,³,⁵⁽¹⁰⁾-estratrien-17β-ol,
3-diethanolamino-Δ¹,³,⁵⁽¹⁰⁾-estratrien-17β-ol 17-acetate,
3-(2'-diethylamino)-ethylamino-Δ¹,³,⁵⁽¹⁰⁾-estratrien-17-one,
3-(2'-diethylamino)-ethylamino-Δ¹,³,⁵⁽¹⁰⁾-estratrien-17β-ol,
3-(2'-diethylamino)-ethylamino-Δ¹,³,⁵⁽¹⁰⁾-estratrien-17β-ol 17-acetate,
3-(2'-diethylamino)-ethylamino-17α-methyl-Δ¹,³,⁵⁽¹⁰⁾-estratrien-17β-ol,
3-(2'-diethylamino)-ethylamino-17α-vinyl-Δ¹,³,⁵⁽¹⁰⁾-estratrien-17β-ol,
3-(2'-diethylamino)-ethylamino-17α-ethynyl-Δ¹,³,⁵⁽¹⁰⁾-estratrien-17β-ol,
3-(p-amino)-phenylamino-Δ¹,³,⁵⁽¹⁰⁾-estratrien-17-one,
3-(N-pyrrolidinyl)-Δ¹,³,⁵⁽¹⁰⁾-estratrien-17-one,
3-(N-pyrrolidinyl)-Δ¹,³,⁵⁽¹⁰⁾-estratrien-17β-ol,
3-(N-pyrrolidinyl)-Δ¹,³,⁵⁽¹⁰⁾-estratrien-17β-ol 17 acetate,
3-(N-pyrrolidinyl)-17α-methyl-Δ¹,³,⁵⁽¹⁰⁾-estratrien-17β-ol,
3-(N-pyrrolidinyl)-17α-vinyl-Δ¹,³,⁵⁽¹⁰⁾-estratrien-17β-ol,
3-(N-pyrrolidinyl)-17α-ethynyl-Δ¹,³,⁵⁽¹⁰⁾-estratrien-17β-ol,
3-(N-piperidinyl)-Δ¹,³,⁵⁽¹⁰⁾-estratrien-17-one,
3-(N-piperidinyl)-Δ¹,³,⁵⁽¹⁰⁾-estratrien-17β-ol,
3-(N-piperidinyl)-Δ¹,³,⁵⁽¹⁰⁾-estratrien-17β-ol-17-one,
3-(N-piperidinyl)-17α-methyl-Δ¹,³,⁵⁽¹⁰⁾-estratrien-17β-ol,
3-(N-piperidinyl)-17α-vinyl-Δ¹,³,⁵⁽¹⁰⁾-estratrien-17β-ol,
3-(N-piperidinyl)-17α-ethynyl-Δ¹,³,⁵⁽¹⁰⁾-estratrien-17β-ol,
3-(N-piperazinyl)-Δ¹,³,⁵⁽¹⁰⁾-estratrien-17-one,
3-(N-piperazinyl)-Δ¹,³,⁵⁽¹⁰⁾estratrien-17β-ol,
3-(N-morpholinyl)-Δ¹,³,⁵⁽¹⁰⁾-estratrien-17-one,
3-(N-morpholinyl)-Δ¹,³,⁵⁽¹⁰⁾-estratrien-17β-ol,
3-(N-carbomethoxymethyl)-Δ¹,³,⁵⁽¹⁰⁾-estratrien-17-one,
3-(N-1-carbethoxyethyl)-Δ¹,³,⁵⁽¹⁰⁾-estratrien-17β-ol,
3-methylamino-19-nor-Δ¹,³,⁵⁽¹⁰⁾-pregnatrien-20-one, 3-diethylamino-19-nor-$\Delta^{1,3,5(10)}$-pregnatrien-20-one,
3-diethylamino-19-nor-$\Delta^{1,3,5(10)}$-pregnatrien-17$\alpha$-ol-20-one,
3-diethylamino-19-nor-$\Delta^{1,3,5(10)}$-pregnatrien-17$\alpha$-ol-20-one 17-acetate,
3-(2'-diethylamino)-ethylamino-19-nor-$\Delta^{1,3,5(10)}$-pregnatrien-20-one,
3-(2'-diethylamino)-ethylamino-19-nor-$\Delta^{1,3,5(10)}$-pregnatrien-17$\alpha$-ol-20-one,
3-(2'-diethylamino)-ethylamino-19-nor-$\Delta^{1,3,5(10)}$-pregnatrien-17$\alpha$-ol-20-one 17-acetate,
3-(N-pyrrolidinyl)-19-nor-$\Delta^{1,3,5(10)}$-pregnatrien-20-one,
3-(N-pyrrolidinyl)-19-nor-$\Delta^{1,3,5(10)}$-pregnatrien-17$\alpha$-ol-20-one,
3-(N-pyrrolidinyl)-19-nor-$\Delta^{1,3,5(10)}$-pregnatrien-17$\alpha$-ol-20-one 17-acetate,
3-(N-piperidinyl)-19-nor-$\Delta^{1,3,5(10)}$-pregnatrien-20-one,
3-(N-piperidinyl)-19-nor-$\Delta^{1,3,5(10)}$-pregnatrien-17$\alpha$-ol-20-one,
3-(N-piperidinyl)-19-nor-$\Delta^{1,3,5(10)}$-pregnatrien-17$\alpha$-ol-20-one 17-acetate,
3-(N-morpholinyl)-19-nor-$\Delta^{1,3,5(10)}$-pregnatrien-20-one,
3-(N-morpholinyl)-19-nor-$\Delta^{1,3,5(10)}$-pregnatrien-17$\alpha$-ol-20-one,
3-(N-morpholinyl)-19-nor-$\Delta^{1,3,5(10)}$-pregnatrien-17$\alpha$-ol-20-one, and the like.

The novel 3-substituted amino-$\Delta^{1,3,5(10)}$-estratrienes represented by Formula I hereinabove are estrogenic agents having utility in fertility control in humans and animals.

The novel 3-substituted amino-19-nor-$\Delta^{1,3,5(10)}$-pregnatrienes represented by Formula II hereinabove are progestational agents having oral activity, and also possess anti-estrogenic, anti-androgenic and anti-gonadotrophic properties.

In order that those skilled in the art can more fully understand the present invention, the following examples are set forth. These examples are given solely for the purpose of illustrating the invention, and should not be considered as expressing limitations unless set forth in the appended claims.

Example I

A solution of 750 mg. of $\Delta^4$-estren-10$\beta$-ol-3, 17-dione 10-acetate in 75 ml. of benzene was admixed with 4.5 ml. of diethylamine and 0.1 ml. of acetic acid, and the resulting reaction mixture was refluxed for 6 hours. Following this reaction period the reaction mixture was concentrated under vacuum to about 20 ml., then filtered through a short column of alumina, using benzene as the eluant. The material obtained from the eluate after evaporation of the benzene was purified by further column chromatography on 36 grams of unwashed alumina, using benzene/diethyl ether as the eluant. The resulting homogeneous, less polar fractions were crystallized from methylene dichloride/hexane and then recrystallized twice from methylene dichloride/methanol, thus giving 3-diethylamino - $\Delta^{1,3,5(10)}$ - estratrien - 17 - one, melting point 131.5–132.5° C.; $\lambda$ max. 2.63 m$\mu$ ($\epsilon$, 14,420) and 310$\mu$ ($\epsilon$, 2,145); [$\alpha$]$_D$+134°; $\nu$ max. 1370 and 1379 cm.$^{-1}$ (C–N), 1525, 1563 and 1584 cm.$^{-1}$ (aromatic ring) and 1754 cm.$^{-1}$ (C=O).

Analysis.—Calc'd. for $C_{22}H_{31}ON$: C, 81.18; H, 9.60; O, 4.92; N, 4.30. Found: C, 81.36; H, 10.19; O, 4.98; N; 3.95.

Example II

A solution of 720 mg. of $\Delta^4$-estren-10$\beta$-ol-3, 17-dione 10-acetate in 70 ml. of benzene was admixed with 0.7 ml. of N,N-diethyl-1,2-ethylene diamine and 0.1 ml. of acetic acid, and the resulting reaction mixture was refluxed, using a water separator, for 1 hour. Following this reaction period the reaction mixture was concentrated under vacuum to a final volume of 20 ml., then worked up in the manner described in Example I hereinabove (with the exception that the final recrystallizations were carried out using methylene dichloride/pentane rather than methylene dichloride/methanol), thus giving 3-(2'-diethylamino)-ethylamino-$\Delta^{1,3,5(10)}$-estratrien-17-one, melting point 98–100° C.; $\lambda$ max. 248 m$\mu$ ($\epsilon$, 13,820) and 300–302 m$\mu$ ($\epsilon$ 2,050); [$\alpha$]$_D$+121°; $\nu$ max. 1370 and 1385 cm.$^{-1}$ (C–N), 3350 cm.$^{-1}$ (N–H), 1508, 1570 and 1615 cm.$^{-1}$ (aromatic ring) and 1738 cm.$^{-1}$ (C=O).

Analysis.—Calc'd. for $C_{24}H_{36}ON_2$: C, 78.21; H, 8.85; O, 4.34; N, 7.60. Found: C, 78.49; H, 9.81; O, 4.22; N, 7.54.

Example III

A solution of 250 mg. of $\Delta^4$-estren-10$\beta$-ol-3, 17-dione 10-acetate in 25 ml. of anhydrous benzene was admixed with 286 mg. of pyrrolidine and refluxed for 1 minute, following which the reaction mixture was allowed to stand at room temperature for 16 hours. Following this reaction period the reaction mixture was diluted with 7.5 ml. of benzene, washed twice with 25 ml. of water, dried over anhydrous sodium sulfate and evaporated to dryness under vacuum. The resulting residue was dissolved in methylene dichloride, decolorized with charcoal, crystallized from methylene dichloride/methanol, then recrystallized three times from methylene dichloride/ethanol, thus giving 3-(N-pyrrolidinyl)-$\Delta^{1,3,5(10)}$-estratrien-17-one, melting point 190–192° C.; $\lambda$ max. 258 m$\mu$ ($\epsilon$, 18,300) and 310–312 m$\mu$ ($\epsilon$, 2,820); [$\alpha$]$_D$+148°; $\nu$ max. 1363 cm.$^{-1}$ (C–N), 1610, 1562 and 1510 cm.$^{-1}$ (aromatic ring) and 1739 cm.$^{-1}$ (C=O).

Analysis.—Calc'd. for $C_{22}H_{29}ON$: C, 81.69; H, 9.04; O, 4.95; N, 4.33. Found: C, 81.76; H, 9.22; O, 5.07; N, 4.38.

By repeating this procedure in every detail but one, namely using $\Delta^4$-estrene-10$\beta$, 17$\beta$-diol-3-one 10-acetate and $\Delta^4$-estrene-10$\beta$, 17$\beta$-diol-3-one 10,17-diacetate, respectively, as the steroid starting materials, 3-(N-pyrrolidinyl)-$\Delta^{1,3,5(10)}$-estratrien-17$\beta$-ol, melting point 178–180° C.; $\lambda$ max. 256 m$\mu$ ($\epsilon$, 17,800) and 312 m$\mu$ ($\epsilon$ 2,750); [$\alpha$]$_D$+78°; $\nu$ max. 1370 cm.$^{-1}$ (C–N), 1525, 1562 and 1612 (aromatic ring) and 3395 cm.$^{-1}$ (OH).

Analysis.—Calc'd. for $C_{22}H_{31}ON$: C, 81.18; H, 9.60; O, 4.92; N, 4.30. Found: C, 80.79; H, 9.71; O, 5.17; N, 4.25, and 3-(N-pyrrolidinyl-$\Delta^{1,3,5(10)}$-estratrien-17$\beta$-ol 17-acetate, melting point 137–138° C.; $\lambda$ max. 258 m$\mu$ ($\epsilon$, 16,600 and 312 m$\mu$ ($\epsilon$, 2,500); [$\alpha$]$_D$+51° C; $\nu$ max. 1350 and 1380 cm.$^{-1}$ (C–N), 1520, 1560 and 1630 (aromatic ring), 1245 cm.$^{-1}$ (C–O) and 1750 cm.$^{-1}$ (C=O).

Analysis.—Calc'd. for $C_{24}H_{33}O_2N$: C, 78.43; H, 9.05. Found: C, 78.85; H, 9.29, respectively, were obtained.

Example IV

A solution of 750 mg. of 3-(N-pyrrolidinyl)-$\Delta^{1,3,5(10)}$-estratrien-17-one in 35 ml. of dioxane and 0.4 ml. of water was admixed with 440 mg. of sodium borohydride, and the resulting reaction mixture was allowed to stand at room temperature for 5 hours. Following this reaction period excess sodium borohydride was decomposed by the careful addition of acetic acid, and the reaction mixture was then diluted with a large volume of water. The resulting precipitate was collected by filtration, washed with water until neutral and dried. Recrystallization from methanol gave 3(N-pyrrolidinyl)-$\Delta^{1,3,5(10)}$-estratrien-17$\beta$-ol, identical to that described in Example III hereinabove.

Example V

A mixture of 600 mg. of 3-(N-pyrrolidinyl)-$\Delta^{1,3,5(10)}$-estratrien-17$\beta$-ol, 2.4 ml. of pyridine and 1.2 ml. of acetic anhydride was heated on a steam bath for 5 hours. Following this reaction period the reaction mixture was poured into ice water and the resulting precipitate was collected by filtration, washed with water and dried. Recrystallization from methylene dichloride/methanol gave 3-(N - pyrrolidinyl - $\Delta^{1,3,5(10)}$ - estratrien-17$\beta$-ol 17-acetate, identical to that prepared as described in Example III hereinabove.

Example VI

A solution of 500 mg. of Δ⁴-estren-10β-ol-3,17-dione 10-acetate in 50 ml. of benzene was admixed with 1 ml. of piperidine and 0.4 ml. of acetic acid, and the resulting reaction mixture was refluxed for 2.5 hours. Following this reaction period the reaction mixture was worked up in the manner described in Example III hereinabove, thus giving 3-(N-piperidinyl)-Δ$^{1,3,5(10)}$-estratrien-17-one, melting point 143–143.5° C.; λ max 250–252 mμ (ε, 11,000) and 322 mμ (ε, 1,620); [α]$_D$+135°; ν max. 1389 and 1370 cm.⁻¹ (C–N), 1510, 1563 and 1613 cm.⁻¹ (aromatic ring) and 1724 cm.⁻¹ (C=O).

*Analysis.*—Calc'd. for C$_{23}$H$_{31}$ON: C, 81.85; H, 9.26; O, 4.74; N, 4.15. Found: C, 82.33; H, 9.36; O, 4.60; N, 4.02.

Example VII

The procedure of Example I hereinabove was repeated in every detail except for the following. In one run, 19-nor-Δ⁴-pregnen-10β-ol-3,20-dione 10-acetate was used as the steroid starting material, and 0.1 ml. of propionic acid was used as the catalyst. In a second run, 19-nor-Δ⁴-pregnene-10β,17α-diol-3,20-dione 10,17-diacetate was used as the steroid starting material, and 0.01% by weight, based on the weight of said steroid starting material, of oxalic acid, was used as the catalyst. In each case, the corresponding 3-diethylamino-19-nor-Δ$^{1,3,5(10)}$-pregnatriene, namely, 3-diethylamino-19-nor-Δ$^{1,3,5(10)}$-pregnatrien-20-one and 3-diethylamino-19-nor-Δ$^{1,3,5(10)}$-pregnatrien-17α-ol-20-one 17-acetate, respectively, was obtained.

Example VIII

The procedure of Example III hereinabove was repeated using 0.001% by weight, based on the weight of the steriod starting material, of acetic acid as catalyst. The same product, namely, 3-(N-pyrrolidinyl)-Δ$^{1,3,5(10)}$-estratrien-17-one, was obtained, and the reaction was complete in 5 hours.

Similarly, by repeating the procedure of Example III hereinabove using the steroid starting materials and catalysts employed in Example VII hereinabove, 3-(N-pyrrolidinyl)-19-nor-Δ$^{1,3,5(10)}$-pregnatrien-20-one and 3-(N-pyrrolidinyl)-19-nor-Δ$^{1,3,5(10)}$-pregnatrien-17α-ol-20-one 17-acetate, respectively, were obtained.

It will be obvious to those skilled in the art that other changes and variations can be made in carrying out the present invention without departing from the spirit and scope thereof as defined in the appended claims.

I claim:

1. A process for the preparation of a 3-substituted amino-Δ$^{1,3,5_{10}}$-steroid which comprises reacting a member selected from the group consisting of 10β-lower acyloxy-Δ⁴-3-keto steroids of the estrane and 19-norpregnane series wherein the lower acyloxy group contains from 2 to 7 carbon atoms, inclusive, dissolved in an inert organic solvent, with a member selected from the group consisting of primary and secondary monoamines and polyamines, in the presence of a weak acid catalyst.

2. A process for the preparation of a 3-methylamino-Δ$^{1,3,5(10)}$-steroid which comprises reacting a member selected from the group consisting of 10β-lower acyloxy-Δ⁴-3-keto steroids of the estrane and 19-norpregnane series wherein the lower acyloxy group contains from 2 to 7 carbon atoms, inclusive, dissolved in an inert organic solvent, with methylamine in the presence of a weak acid catalyst.

3. A process for the preparation of a 3-diethylamino-Δ$^{1,3,5(10)}$-steroid which comprises reacting a member selected from the group consisting of 10β-lower acyloxy-Δ⁴-3-keto steroids of the estrane and 19-norpregnane series wherein the lower acyloxy group contains from 2 to 7 carbon atoms, inclusive, dissolved in an inert organic solvent, with diethylamine in the presence of a weak acid catalyst.

4. A process for the preparation of a 3-benzylamino-Δ$^{1,3,5(10)}$-steroid which comprises reacting a member selected from the group consisting of 10β-lower acyloxy-Δ⁴-3-keto steroids of the estrane and 19-norpregnane series wherein the lower acyloxy group contains from 2 to 7 carbon atoms, inclusive, dissolved in an inert organic solvent, with benzylamine in the presence of a weak acid catalyst.

5. A process for the preparation of a 3-(2'-diethylamino)-ethylamino-Δ$^{1,3,5(10)}$-steroid which comprises reacting a member selected from the group consisting of 10β-lower acyloxy-Δ⁴-3-keto steroids of the estrane and 19-norpregnane series wherein the lower acyloxy group contains from 2 to 7 carbon atoms, inclusive, dissolved in an inert organic solvent, with (N,N)-diethyl-1,2-ethylenediamine in the presence of a weak acid catalyst.

6. A process for the preparation of a 3-(N-piperidinyl)-Δ$^{1,3,5(10)}$-steroid which comprises reacting a member selected from the group consisting of 10β-lower acyloxy-Δ⁴-3-keto steroids of the estrane and 19-norpregnane series wherein the lower acyloxy group contains from 2 to 7 carbon atoms, inclusive, dissolved in an inert organic solvent, with piperidine in the presence of a weak acid catalyst.

7. A process for the preparation of a 3-(N-morpholinyl)-Δ$^{1,3,5(10)}$-steroid which comprises reacting a member selected from the group consisting of 10β-lower acyloxy-Δ⁴-3-keto steroids of the estrane and 19-norpregnane series wherein the lower acyloxy group contains from 2 to 7 carbon atoms, inclusive, dissolved in an inert organic solvent, with morpholine in the presence of a weak acid catalyst.

8. A process for the preparation of a 3-(N-pyrrolidinyl) Δ$^{1,3,5(10)}$-steroid which comprises reacting a member selected from the group consisting of 10β-lower acyloxy-Δ⁴-3-keto steroids of the estrane and 19-norpregnane series wherein the lower acyloxy group contains from 2 to 7 carbon atoms, inclusive, dissolved in an inert organic solvent, with pyrrolidine.

9. A process for the preparation of a 3-methylamino-Δ$^{1,3,5(10)}$-steroid which comprises reacting a member selected from the group consisting of 10β-lower acyloxy-Δ⁴-3-keto steroids of the estrane and 19-norpregnane series wherein the lower acyloxy group contains from 2 to 7 carbon atoms, inclusive, dissolved in an inert organic solvent, with methylamine in the presence of a catalytic amount of acetic acid.

10. A process for the preparation of a 3-diethylamino-Δ$^{1,3,5(10)}$-steroid which comprises reacting a member selected from the group consisting of 10β-lower acyloxy-Δ⁴-3-keto steroids of the estrane and 19-norpregnane series wherein the lower acyloxy group contains from 2 to 7 carbon atoms, inclusive, dissolved in an inert organic solvent, with diethylamine in the presence of a catalytic amount of acetic acid.

11. A process for the preparation of a 3-benzylamino-Δ$^{1,3,5(10)}$-steroid which comprises reacting a member selected from the group consisting of 10β-lower acyloxy-Δ⁴-3-keto steroids of the estrane and 19-norpregnane series wherein the lower acyloxy group contains from 2 to 7 carbon atoms, inclusive, dissolved in an inert organic solvent, with benzylamine in the presence of a catalytic amount of acetic acid.

12. A process for the preparation of a 3(2'-diethylamino)-ethylamino-Δ$^{1,3,5(10)}$-steroid which comprises reacting a member selected from the group consisting of 10β-lower acyloxy-Δ⁴-3-keto steroids of the estrane and 19-norpregnane series wherein the lower acyloxy group contains from 2 to 7 carbon atoms, inclusive, dissolved in an inert organic solvent, with (N,N)-diethyl-1,2-ethylenediamine in the presence of a catalytic amount of acetic acid.

13. A process for the preparation of a 3-(N-piperidinyl)-Δ$^{1,3,5(10)}$-steroid which comprises reacting a member selected from the group consisting of 10β-lower acyloxy-Δ⁴-3-keto steroids of the estrane and 19-norpregnane series wherein the lower acyloxy group contains from 2 to 7 carbon atoms, inclusive, dissolved in an inert organic solvent, with piperidine in the presence of a catalytic amount of acetic acid.

14. A process for the preparation of a 3-(N-morpholinyl)-$\Delta^{1,3,5(10)}$-steroid which comprises reacting a member selected from the group consisting of 10β-lower acyloxy-$\Delta^4$-3-keto steroids of the estrane and 19-norpregnane series wherein the lower acyloxy group contains from 2 to 7 carbon atoms, inclusive, dissolved in an inert organic solvent, with morpholine in the presence of a catalytic amount of acetic acid.

15. A process for the preparation of 3-diethylamino-$\Delta^{1,3,5(10)}$-estratrien-17-one which comprises reacting $\Delta^4$-estren-10β-ol-3,17-dione 10-acetate, dissolved in benzene, with diethylamine in the presence of a catalytic amount of acetic acid.

16. A process for the preparation of 3-(N-pyrrolidinyl)-$\Delta^{1,3,5(10)}$-estratrien-17-one which comprises reacting $\Delta^4$-estren-10β-ol-3,17-dione 10-acetate, dissolved in benzene, with pyrrolidine.

17. A process for the preparation of 3-diethylamino-19-nor-$\Delta^{1,3,5(10)}$-pregnatrien-20-one which comprises reacting 19-nor-$\Delta^4$-pregnen-10β-ol-3,20-dione 10-acetate, dissolved in benzene, with diethylamine in the presence of a catalytic amount of acetic acid.

18. A process for the preparation of 3-(N-pyrrolidino)-19-nor-$\Delta^{1,3,5(10)}$-pregnatrien-20-one which comprises reacting 19-nor-$\Delta^4$-pregnen-10β-ol-3,20-dione 10-acetate, dissolved in benzene, with pyrrolidine.

No references cited.

LEWIS GOTTS, *Primary Examiner.*

HENRY A. FRENCH, *Assistant Examiner.*

UNITED STATES PATENT OFFICE
CERTIFICATE OF CORRECTION

Patent No. 3,294,784 December 27, 1966

Francisco Alvarez

It is hereby certified that error appears in the above numbered patent requiring correction and that the said Letters Patent should read as corrected below.

Column 7, line 51, for "$\Delta^{1,3,510}$" read -- $\Delta^{1,3,5(10)}$ --.

Signed and sealed this 12th day of September 1967.

(SEAL)
Attest:

ERNEST W. SWIDER
Attesting Officer

EDWARD J. BRENNER
Commissioner of Patents